Nov. 6, 1934.  C. L. JONES ET AL  1,979,556
APPARATUS FOR AND METHOD OF MAKING SOLID CARBON DIOXIDE
Filed Oct. 30, 1929  3 Sheets-Sheet 1

INVENTOR
Charles L. Jones
William H. Fitzpatrick
BY
ATTORNEY

Nov. 6, 1934.    C. L. JONES ET AL    1,979,556
APPARATUS FOR AND METHOD OF MAKING SOLID CARBON DIOXIDE
Filed Oct. 30, 1929    3 Sheets-Sheet 3

INVENTOR
Charles L. Jones
William H. Fitzpatrick
BY
ATTORNEY

Patented Nov. 6, 1934

1,979,556

UNITED STATES PATENT OFFICE 1,979,556

APPARATUS FOR AND METHOD OF MAKING SOLID CARBON DIOXIDE

Charles L. Jones, Pelham, and William H. Fitzpatrick, Jackson Heights, N. Y., assignors, by mesne assignments, to Adico Development Corporation Application October 30, 1929, Serial No. 403,416

14 Claims. (Cl. 62—121)

Our present invention relates to the production of solid carbon dioxide by expansion of liquid carbon dioxide to gasify part of it and freeze the remainder. It includes a multiple-purpose apparatus capable of being operated to effect the expansion, gasification and freezing by various methods, whereby the frozen product may be made to have correspondingly different qualities; said apparatus being also capable of being operated for compression of these products into blocks of various forms, sizes and densities. These blocks will have various qualities, depending upon the qualities of the frozen product from which they are compressed, and upon the amount and duration of the pressure whereby the compression is effected.

Solid carbon dioxide blocks have been produced commercially by pressing ordinary carbon dioxide snow in molds and this has been accomplished in both open or closed molds, in various forms of presses known to the art. Closed mold presses are either vertical or horizontal and may have the snow formed and deposited either in the press chamber or mold or in a separate snow forming chamber from which the snow is fed into the press chamber by suitable snow feed mechanism. Many of the commercial uses, as well as economy of production, storage and transportation, require that the blocks be of substantial thickness, and we know of no case in which the desired uniform density has been attained in blocks of standard commercial thickness, except by tamping the snow in the mold to produce a uniformly packed charge, before the mold pressure is applied; or else by compressing the block between two movable platens pressed in from opposite ends of the mold. The former method is set forth in the application of Martin, Ser. No. 152,754, and the latter method in an application by one of us.

One object of our invention is to provide an apparatus which, without utilizing either of the foregoing expedients, is capable of forming blocks of solid carbon dioxide of commercial thickness and of uniform density from top to bottom.

Another object is provision of a press in which the solid carbon dioxide is formed within the press chamber and is accumulated in uniformly packed charges that are accurately metered for production of blocks of desired size as well as uniform density.

Another object is to provide a press in which snow may be formed in the ordinary way by expansion of the liquid to any known or desired form of expansion nozzle; or in which the expansion may be against any desired back pressure that will not prevent jet gasification and freezing, that is, back pressures less than 60 pounds above atmosphere; or in which the carbon dioxide may be charged into the press chamber at pressures above 60 pounds gauge, so that it will be in liquid form and the liquid can be boiled at any desired rate, against suitable back pressure, to gasify part of the carbon dioxide and thereby freeze the remainder. Part of the boiling may be effected during the charging operation, thereby reducing the liquid to the freezing point, or even freezing a portion of it. In any event, after a predetermined amount of carbon dioxide has been admitted, the supply may be cut off and the charge permitted to boil off at a desired regulated rate, after the manner set forth in the application by one of us, Ser. No. 346,546.

Another object of our invention is to provide a press wherein a plurality of relatively small blocks of dense, commercial solid carbon dioxide can be produced simultaneously, either completely separated from each other or merely scored for ready subdivision by sawing or breaking.

The above and other features of our invention may be more fully understood from the following description in connection with the accompanying drawings, in which Fig. 1 is a vertical, axial, sectional view of a press with auxiliary apparatus diagrammatically indicated, illustrating one embodiment of our invention;

Figure 1:
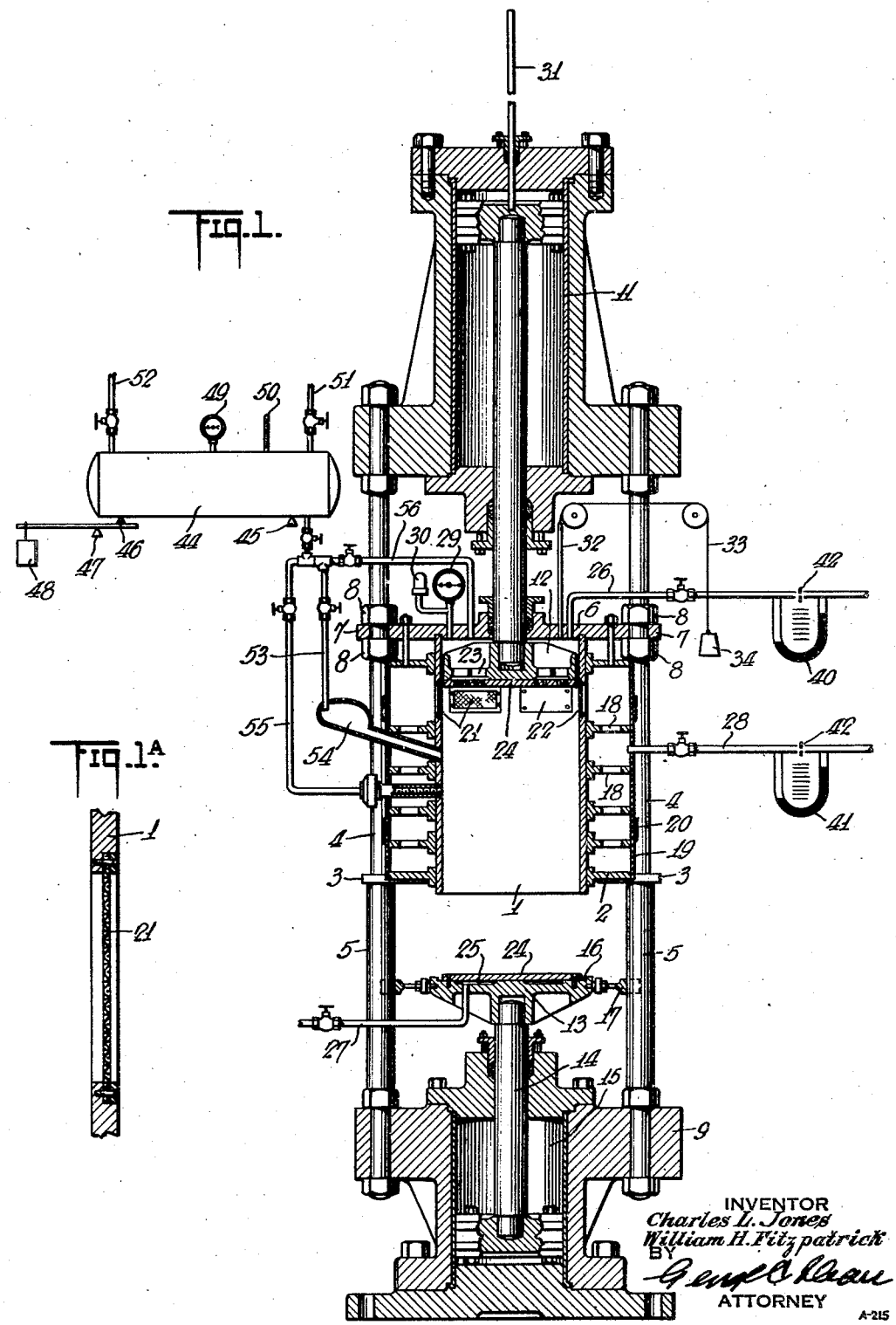
Fig. 1a is a cross sectional view through a portion of the compression chamber and one of the screens showing its manner of attachment thereto.

In Fig. 1 the mold or compression chamber 1, is preferably square in horizontal section. It may be formed from four flat steel plates welded together at the corners after which the interior may be machined to accurate shape, as for instance, the corners may be filleted on a radius of ¼ inch or more and the interior surfaces may be flared slightly towards the bottom so that when the compressed block has been finished, it can be more easily ejected. The compression chamber is supported at the bottom by a casting 2, welded to the exterior thereof and formed with ears 3 encircling tie bolts 4, 4, and resting on spacing sleeves 5, 5. The upper end of the compression chamber 1, is fitted into a groove in the bottom of a casting 6 which has ears 7, 7, also encircling the bolts 4 which are held in fixed position thereon by nuts 8, 8.

The bolts 4, 4, constitute the frame of the machine and are rigidly bolted through a massive base 9 at the bottom. By tightening down the nuts 8, 8, the upper end enclosure 6 is forced down upon the upper edge of the compression chamber which cannot yield because it is supported by the ears 3, 3, on the spacer sleeves 5, 5.

By this construction, the joint of the end closure with the compression chamber may be made as tight as desired. It could be secured by welding, but this is not necessary and the detachable feature greatly facilitates taking down the machine for cleaning, repairs, or replacement. The upper ends of rod members 4 carry hydraulic cylinder 11, which may be of any known or desired construction capable of exerting the required high pressures on the compression piston 12.

The compression chamber has a bottom closure 13 adapted to seal the bottom of the compression chamber 1 during the charging, expansion and freezing operations, whereby the solid carbon dioxide is deposited in the compression chamber. As it has to be removed in order to extract the completed block of solid carbon dioxide, the means for holding it in place is preferably the piston rod 14 of an upwardly acting power cylinder 15. The closure is provided with a groove 16, which fits over the bottom edge of the compression chamber and the closure is prevented from rotating out of registry therewith by guide members 17, sliding on the spacer sleeves 5.

Preferably, the exterior of the compression chamber 1, is reenforced by casting frames 18, fitted over the outside of said chamber and preferably welded in place. Preferably the outer edges of frames 18 fit and form supports for an exterior gas jacket 19 which is preferably cylindrical and reenforced by bands 20. This gas jacket is preferably welded to the bottom 2 and top 6.

By the above construction, the flat sides of the mold or compression chamber, 1, may be made capable of withstanding the maximum pressures that can take effect thereon, when the piston 12 is exerting maximum pressure on the solid carbon dioxide charge, and in certain cases this may be 900 pounds per square inch or more. The jacket is also designed for maximum internal working pressures of the gas, which may be over 100 pounds per square inch, plus a large safety factor.

The compression chamber is provided, preferably above the piston 12, with a pressure gauge 29 and safety valve 30.

For general utility purposes, the mold or compression chamber and the top piston and preferably also the bottom piston, are provided with removable or interchangeable parts whereby the gasification and freezing, attendant upon deposit of the solid carbon dioxide in the mold, may be effected according to any known or desired method, from ordinary snow making at or near atmospheric pressure, up to boiling of liquid at pressures above the triple point, which is 75 pounds absolute or 60 pounds gauge.

For ordinary snow making and even for other purposes, it is desirable to have large screen area passages through which the gas may be withdrawn without undue loss of snow or liquid. To this end, I have shown in the upper lefthand walls of the chambers, screens 21, which may be of woven wire, 40 mesh or finer. The frames of these screens are set in grooves or recesses at the bottom and secured by screws at the top. This merely illustrates one way in which the screens may be readily removed through the interior open bottom of the compression chamber, and some or all of them replaced by solid plates 22 such as are shown at the upper right hand of the compression chamber, in Fig. 1. Usually, they will all be screens when maximum screen area is desired for the escaping gas; and usually they will all be solid plates when maximum internal gas pressure is desired, as for charging in and boiling off liquid carbon dioxide.

Figure 3:
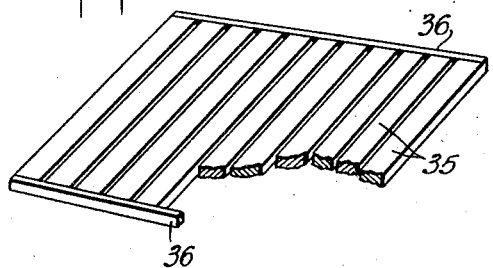
Fig. 3 is a perspective view of a platen for the press, parts being broken away to show the construction.
Figure 4:
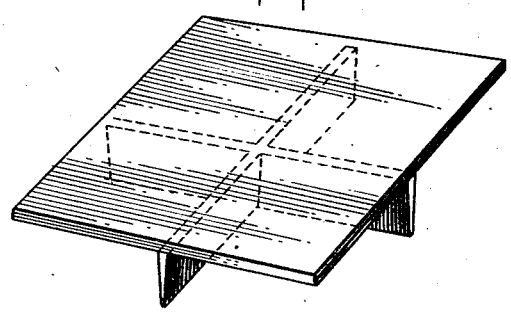
Fig. 4 is a perspective view showing a modified form of platen for the upper piston of the press.

Preferably, the upper piston 12 fits the compression chamber rather loosely so as to permit upward escape of gas around the periphery. Preferably, also, it is provided with interior passages 23, which can also be utilized for escape of the gas. As shown in the drawings, this piston 12 is provided with a platen 24 which is perforated by many small holes, say, $\tfrac{1}{16}$ inch in diameter, through which gas may escape for outflow through said passages 23. This perforated platen 24 is removable and can be replaced by a solid plate such as shown at 24a, Fig. 5. Instead of a perforated platen, I may use a grid such as shown in Fig. 3. For a compression chamber 20 inches square, such a grid may consist of bars 35, which may be say 1½ inches by ½ inch, spaced apart say $\tfrac{1}{16}$ inch and secured at the ends to frame members 36, by welding or otherwise.

The face of the lower piston 13 is recessed at 25, so that it can be used with perforated or solid plates like 24 or 24a. When the unperforated plates are used as, for instance, in boiling off liquid under a high counterpressure, the gas may be vented or withdrawn through upper platen and pipe 26; or when perforated or grid plates are used as when operating by the snow making method the gas can be vented or withdrawn through the lower platen and pipe 27. When the gas is allowed to escape into the jacket space, through one or more of the screens 21, or otherwise, the gas may be vented or withdrawn through pipe 28. All of these escape pipes preferably lead back to liquefying plant and where the gas is utilized as part of the primary supply of gas from which the liquid carbon dioxide is made.

Each of these gas escape lines may be provided with an orifice meter such as diagrammatically indicated at 40, for pipe 26 and at 41, for pipe 28. In the present instance the diagrammatic indication is that the meters consist essentially of an orifice diaphragm diagrammatically indicated at 42, in combination with means for measuring the pressure drop in the pipe, on opposite sides of the diaphragm, the means shown consisting of a U-tube having the bend filled with mercury and the rate of flow through the diaphragm orifice being indicated by the differences in heights of the mercury in the two arms of the U. When the liquid carbon dioxide temperature is definitely known, the amount of gas metered by these meters is an accurate indication of the amount of carbon dioxide that is in the chamber. That is, when snow is being formed directly by jet expansion as the liquid enters the chamber, experience will show what volume of solid products deposited within the compression chamber will correspond to a given volume of the escaping gas. Similarly when liquid is charged into the chamber and boiled off, experience will show what the solid remnants should be for a given amount of gas boiled off against a predetermined counterpressure.

In such a connection, it is desirable to know the total amount of liquid introduced on each charge as well as its temperature and pressure. For such purposes, I may provide a reservoir tank 44, mounted on some sort of scale mechanism for weighing the tank and its contents, this being diagrammatically indicated in the drawing as consisting of a stationary pivotal support 45 and a movable support 46, the latter being on the short arm of a lever fulcrumed on a knife-edged pivot 47 having a long arm provided with a weighing scale and an adjustable weight 48. The weight of the tank when empty subtracted from the gross weight of the tank when it contains liquid, will give the precise weight of liquid in the tank, and the differences between the weights at the beginning of a charge of the compression chamber and the end of said charge will determine precisely the weight of carbon dioxide that has been discharged into the chamber. It will be apparent that when a weighed charge of liquid at a definitely known temperature is introduced into the press, a definite and reproducible weight of the solid will be produced. The tank 44 is preferably provided with a pressure gauge 49 and a thermometer 50 for determining the pressure and temperature of the liquid.

Instead of providing the tank 44 with means for weighing it, I may employ a calibrated gauge glass or float indicator that will show the level and consequently the volume of liquid carbon dioxide in the tank; the volume being known, the pressure and temperature may be used to determine the weight, either by calculation at the time or by a table worked out beforehand.

For operation in accordance with certain of the methods hereinafter described, it is desirable to have an indicator to indicate the position of upper piston 12. The least complicated arrangement is a graduated rod as 31, carried by the upper piston and projecting through the upper end of the power cylinder. In a large machine, it may be desirable to have in addition or as a substitute, a rod 32 slidable vertically through a gastight opening in the upper end closure 6 of the compression chamber. If there is room for it, this may be connected to slide with the piston, but as shown, it is normally held in the uppermost position by a cord 33 and weight 34. The rod 32 may be used as a feeler, being depressed by hand, when desired, until it contacts with the piston 12, the length of the projecting portion of the rod then indicating the position of the piston.

The tank 44 is supplied from the source through line 51 and it is provided with a vent line 52 leading back to the compressor system and so arranged that it may be used to release tank pressure and thus boil down the liquid in the receiver to any desired low temperature, before admitting it to the press chamber. Preferably, the pressure corresponds to the temperature, but in any event will be kept substantially above the triple point.

It will be apparent that when a weighed charge of liquid at a definitely known temperature is introduced into the press, a definite and reproducible weight of solid will be produced; and the colder the liquid, the higher will be the percentage of the solid.

By thus boiling down liquid in tank 44 to or near the triple point and charging it into chamber, 1, against substantial counterpressure, we can fill the chamber with liquid very rapidly without danger of its boiling over.

In case it is not practical to thus use a vent line 52, to precool and reduce pressure on the liquid, we may provide one or more chambers such as the chamber 54 in line 53 which may be any one of a variety of sizes and shapes, provided they are so disposed as to substantially reduce the velocity of the carbon dioxide before it enters the press.

It will be found advantageous to use the vent line 28 when a jet nozzle is used on supply pipe 55 and snow is deposited as such in the chamber 1, thus using screens 21 to separate the snow from the gas. Any snow clinging to screens is then removed by the piston 12 on its next downward stroke.

When the carbon dioxide is to be deposited in the chamber as a liquid, it will be found preferable to use supply pipe 56, thus forcing the liquid and any gas that may be formed, to travel between the piston 12 and the walls of the chamber 1, thereby effectively preventing foaming or boiling over of liquid, and minimizing entertainment of fine droplets of liquid carbon dioxide which might pass through a screen. After the supply 56 has been cut off and also, if desired, before it has completed delivery of the liquid, the gas may be vented through line 26.

When liquid temperature and pressure are sufficiently constant we may deposit solid in the chamber, relying on time of flow alone to indicate amount of solid in the chamber. When this is not the case, we fall back upon weighing the liquid supply or metering the gas constituent, or we may lower the upper porous platen 24 to a suitable position lower than screens 21 and introduce liquid through pipe 55. In this case, a definitely measured pressure is maintained above the piston of the upper power cylinder 11, which pressure will vary with the size of the press, as well as the liquid temperature. Snow is then formed below the platen 24, the gas escaping through the platen, until the snow becomes sufficiently tightly packed to move the piston upward against the predetermined pressure. The position of the piston is then a direct measure of the amount of solid in the chamber and at the same time serves to insure uniform tight packing of the carbon dioxide in the chamber.

Figure 5:
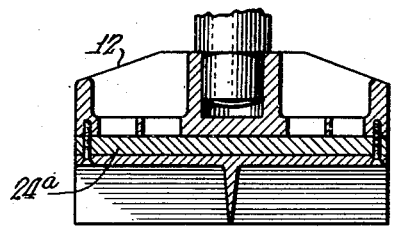
Fig. 5 is a sectional view showing the attachment in place on the piston.

Provision is made for attaching spacer partitions to the platens, particularly the upper platen as shown in Fig. 5. In use, these partitions have the effect of scoring the block to facilitate later sawing or breaking into smaller blocks. Placing these partitions on the upper or moving platen also has the effect of transmitting pressure deeper into the block being pressed.

Figure 6:
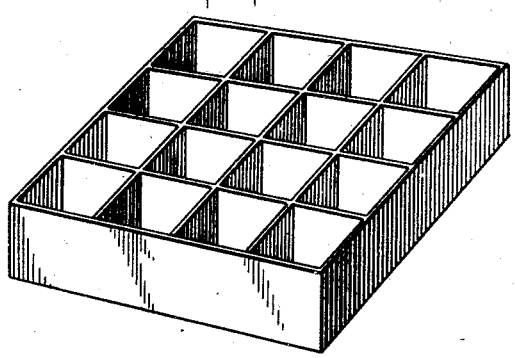
Fig. 6 is a perspective view of a supplemental partitioning device in which the frozen carbon dioxide may be compressed to form a multiplicity of small blocks simultaneously.
Figure 7:
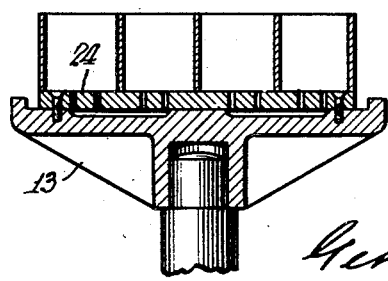
Fig. 7 is a sectional view showing the partitioning device associated with the lower piston.

A partitioned multi-cellular frame may also be employed as illustrated in Fig. 7. In use, this multi-cellular frame is placed on the lower platen, the chamber is closed, and carbon dioxide is introduced until the chamber 1 reaches or exceeds the triple point pressure of carbon dioxide—approximately 5.1 atmospheres. Gas is then drawn off through the pipe 27 at a pressure below the triple point and returned to the recompression system. A mat of permeable solid carbon dioxide will be formed on the porous platen 24, which grows progressively thicker by evaporation on the solid already formed, the gas formed in solidification passing down through the solid already formed, and filling the cells in the frame of Fig. 6. The multi-cellular frame and its contents are then forced out of the chamber by means of upper platen and the individual blocks forced or permitted to melt out of their respective cells.

From the above, it will be obvious that the apparatus shown in Fig. 1 may be used for depositing snow directly in the press chamber 1, in which case the snow nozzle will be located at a low level, preferably just above the top of a block of maximum thickness, that is to be compressed from the snow, the snow forming jet being supplied through pipe 55. In this case, all screens 21 will be in place and gas will be vented through pipe 28. During final compression of the block, the porous platens 24 may be used to permit escape of gas from the block either at the top or the bottom or both, but solid platens may be substituted, particularly where very high pressure is applied to the block.

In certain cases, the snow forming jet may be operated against high counterpressure, near the triple point, so that the solid will be coarse-grained, or even wet, so that screens 21 may be removed and solid plates 22 substituted. In such case, any remnant of liquid may be boiled off either through the upper platen or the lower platen, or both, or solid platens may be used, the gas being drawn off through pipe 26.

When liquid carbon dioxide is charged into the press at pressures above the triple point, the solid platens are preferable.

A composite method may be used where counterpressures are adjusted below, at and above the triple point. In such case, the upper platen may be solid and the lower platen 21 porous. When the lower end of the press chamber is first closed to begin the operation, the liquid will evaporate until the desired high back pressure is attained, thereby cooling the press and depositing some snow. A layer of snow thus formed on the lower platen will subsequently serve as a screen and when the pressure has been built up above the triple point, the discharge will be liquid which can be boiled off through 26; or the gas may be drawn off through the snow and pipe 27, thus building up a relatively firm block of solid carbon dioxide, traversed only by pores through which the gas escapes to and through the bottom platen.

Figure 2:
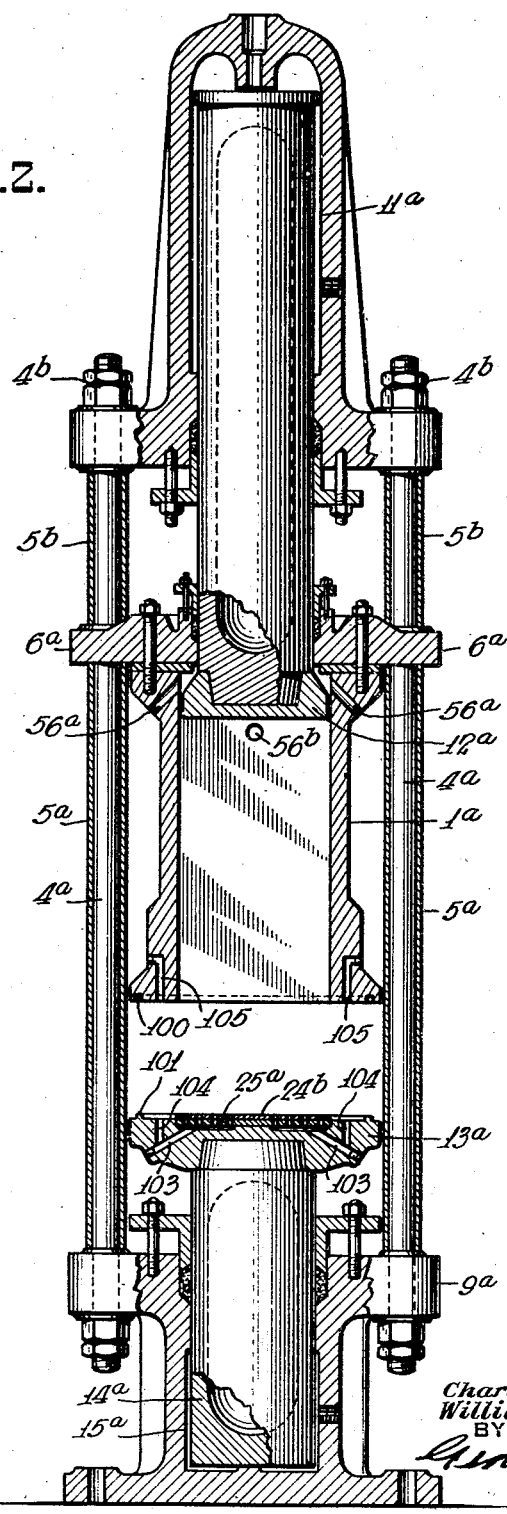
Fig. 2 is a similar view of a modified press, without the auxiliary apparatus.

In Fig. 2, I have shown a much smaller press, more especially adapted for operations at and above the triple point of the liquid and particularly for the bottom boiling operation last described. The construction will be obvious from the drawings. There is a massive steel compression chamber, 1a, bolted to a top closure 6a, having marginal ears encircling bolt rods 4a and resting upon spacer sleeves 5a which abut upon a lower support 9a, through which the bolt 4a extends. The bottom closure 13a is carried by the piston 14a of a power cylinder 15a. The upper piston head 12a is solid and the cylinder 11a for operating it is supported on spacer sleeves 5b, on which it is held in position by the bolts 4b.

The carbon dioxide lines may be connected for charging the press chamber, through ports 56a opening above the piston or through passage 56b below the piston. Passage 56b could be used for a gas outlet for top boiling of the liquid, but the apparatus is particularly designed for the above described bottom boiling operation, being provided with a perforated platen 24b, through which gas can escape to the annular space 25a. An important feature is provision of means for taking care of this gas without having the gas discharge line carried by the movable bottom of the press chamber. As shown, the bottom of the press chamber is provided with a flange having a downwardly opening marginal groove 100 and the upper faces of the platen have a corresponding marginal rib 101, accurately machined so as to fit the groove. This affords a substantial seal against escape of the gas partly because of the accurate fit and partly because the condensed moisture which inevitably collects during operation of such apparatus will freeze in place and afford such additional packing as may be needed.

Provision is made for escape of the gas from the porous platen 24b, by providing the recesses 25a with vent passages 103 communicating with vertical passages 104 which register exactly with outlet passages 105 in the lower edge of the press chamber. It will be observed that when the bottom closure is in place, a continuous vertical passage is formed and the joint between the upper and lower sections of said passage is within the periphery of the sealing rib 101. Consequently, the interval pressure can vent itself through the perforated plate and passages 103, 104 much more easily than through the joint due to any gap between 104 and 105. In any event, such gap is very thin as compared with the diameter of the perforations in 24b and will be quickly sealed by snow or frost in case there is any tendency to short circuit outflow of gas from the compression chamber directly to vent passage 105.

A novel feature of this press is the use of a single acting piston and cylinder to compress solid carbon dioxide in the press chamber. This is made possible by having the piston rod of a diameter and cross section approximating that of the pressure head 12a, whereby the piston rod itself becomes effective as a piston to be lifted by internal gas pressure applied within the press chamber, after the actuating pressure has been cut off from the power cylinder 11.

It is understood that while this press is particularly designed for charging in liquid carbon dioxide at and above the triple point and boiling off part of it to freeze the remainder, at any desired rate, the piping and other apparatus for delivering the liquid charge, determining the amount of each charge, boiling it off and determining the amounts of resultant solid deposited in the press chamber, etc., may all be similar to that described in detail in connection with Figs. 1 to 7 inclusive.

We claim:

1. Apparatus for making blocks of solid carbon dioxide of approximately standard size and density, including a pressure chamber, a power operated plunger therein, and a removable wall against which the plunger compresses the block, in combination with a source of supply of liquid carbon dioxide for discharge into said chamber, means for removing gas from said chamber and means for determining the weight of the liquid discharged.

2. Liquid-solid conversion apparatus for carbon dioxide, including a base, uprights, a top member and a closed-top, open-bottom pressure chamber supported by the uprights in combination with a closure for the bottom of the chamber and means for operating it including a power cylinder in the base; and compressing means including a plunger in the pressure chamber and means for operating it including a power cylinder secured to the uprights, the plunger and closure being provided with interchangeable porous and solid face-plates.

3. Liquid-solid conversion apparatus for carbon dioxide, including a base, uprights, a top member and a closed-top, open-bottom pressure chamber supported by the uprights in combination with a closure for the bottom of the chamber and means for operating it including a power cylinder in the base; and compressing means including a plunger in the pressure chamber and means for operating it including a power cylinder secured to the uprights, the plunger and closure being provided with interchangeable porous and solid face-plates and means for removing gas escaping through either of them when a porous face-plate is used thereon.

4. Liquid-solid conversion apparatus for carbon dioxide, including a base, uprights, a top member and a closed-top, open-bottom pressure chamber supported by the uprights in combination with a closure for the bottom of the chamber and means for operating it including a power cylinder in the base; and compressing means including a plunger in the pressure chamber and means for operating it including a power cylinder secured to the uprights and means for charging liquid into the chamber above the plunger when in the retracted position.

5. Liquid-solid conversion apparatus for carbon dioxide, including a base, uprights, a top member and a closed-top, open-bottom pressure chamber supported by the uprights in combination with a closure for the bottom of the chamber and means for operating it including a power cylinder in the base; and compressing means including a plunger in the pressure chamber and means for operating it including a power cylinder secured to the uprights and means for charging liquid into the chamber above the plunger when in the retracted position and means for maintaining counterpressure above the triple point during the charging operation.

6. Apparatus for making solid carbon dioxide from liquid, including a pressure chamber, a plunger reciprocating downward therein and a removable bottom closure adapted to hermetically seal the bottom of said pressure chamber, the upper part of said chamber being provided with a plurality of openings of relatively large area having screens removably fitted therein.

7. Apparatus for making solid carbon dioxide from liquid, including a pressure chamber, a plunger reciprocating downward therein and a removable bottom closure adapted to hermetically seal the bottom of said pressure chamber, the upper part of said chamber being provided with a plurality of openings of relatively large area covered by interchangeable removable elements of different structure and an exterior jacket into which gas may escape when the openings are not completely closed.

8. A pressure chamber closed at one end, a plunger in the chamber operated by a power piston rod extending through said closed end and a closure for the other end of the chamber also carried by a piston of a power cylinder, said closure having passages for escape of gas from the interior, and connecting passages opening through the contacting closure face thereof adapted to register with outlets in the lower edge of the cylinder, when the bottom is held in closed position.

9. A pressure chamber closed at one end, a plunger in the chamber and a power operated rod extending through said closed end and a power operated closure for the other end of the chamber; said closure having a porous platen and passages affording outlet from the rear thereof and opening through the contacting closure face and adapted to register with outlets in the lower edge of the chamber, when the closure is held in closed position, said openings being within the periphery of a sealing rib and groove forming a joint between said face of the closure and the lower surface of the pressure chamber.

10. A press for solid carbon dioxide, comprising a vertical chamber, a lower platen having a solid surface which acts as a closure for the bottom, and an upper platen having a porous or permeable surface adapted to be forced upwardly by the charge of snow accumulating in the chamber.

11. Apparatus for manufacture of solid carbon dioxide, including a closed press connected with a tank for measuring definitely known quantities of liquid carbon dioxide to be expanded in the press.

12. The method which includes charging liquid carbon dioxide into a receptacle and evaporating some of the liquid to cool the remainder nearly to the triple point, charging the cooled liquid into a chamber against counterpressure such that the charge includes substantial quantities of liquid; boiling the charge to form solid in said chamber.

13. The method which includes charging liquid carbon dioxide into a receptacle and evaporating some of the liquid to cool the remainder nearly to the triple point, charging the cooled liquid into a chamber against counterpressure such that the charge includes substantial quantities of liquid; boiling the charge to form solid in said chamber, and compressing the solid while in said chamber to form a solid block or blocks.

14. The method which includes charging liquid carbon dioxide into a receptacle and evaporating some of the liquid to cool the remainder nearly to the triple point, charging the cooled liquid into a chamber against counterpressure sufficient to ensure the liquid state for the completed charge; boiling the charge to form solid in said chamber, and compressing the solid while in said chamber, to form a solid block or blocks.

CHARLES L. JONES.
WILLIAM H. FITZPATRICK.